(12) United States Patent
Lemmen et al.

(10) Patent No.: US 11,310,967 B2
(45) Date of Patent: Apr. 26, 2022

(54) DEVICE FOR GROWING MUSHROOMS

(71) Applicants: Jacobus Alexander Jozef Lemmen, Venlo (NL); Marcus Gerardus Maria Van Doremaele, Velddriel (NL)

(72) Inventors: Jacobus Alexander Jozef Lemmen, Venlo (NL); Marcus Gerardus Maria Van Doremaele, Velddriel (NL)

( * ) Notice: Subject to any disclaimer, the term of this patent is extended or adjusted under 35 U.S.C. 154(b) by 29 days.

(21) Appl. No.: 16/878,676

(22) Filed: May 20, 2020

(65) Prior Publication Data

US 2020/0367450 A1    Nov. 26, 2020

(30) Foreign Application Priority Data

May 20, 2019  (NL) ..................................... 2023168
Dec. 4, 2019  (NL) ..................................... 2024382

(51) Int. Cl.
*A01G 18/62*    (2018.01)
*A01G 18/70*    (2018.01)
*A01G 18/64*    (2018.01)

(52) U.S. Cl.
CPC ............. *A01G 18/62* (2018.02); *A01G 18/64* (2018.02); *A01G 18/70* (2018.02)

(58) Field of Classification Search
CPC ........ A01G 18/00; A01G 18/20; A01G 18/62; A01G 18/69
See application file for complete search history.

(56) References Cited

U.S. PATENT DOCUMENTS

2020/0100437 A1*  4/2020  Christiaens ............ A01G 18/69

FOREIGN PATENT DOCUMENTS

| CN | 203985152 | 12/2014 |
|----|-----------|---------|
| CN | 105917957 | 9/2016  |
| CN | 207040404 | 2/2018  |

(Continued)

OTHER PUBLICATIONS

European Search Report and the European Search Opinion dated Sep. 24, 2020 From the European Patent Office Re. Application No. 20175661.6. (7 Pages).

(Continued)

*Primary Examiner* — Monica L Barlow
*Assistant Examiner* — Aaron M Rodziwicz

(57) ABSTRACT

The present invention relates to a device for growing mushrooms, comprising a shelving, arranged for supporting beds for holding casing soil and compost on a pulling net, wherein the beds are placed at a mutual distance above each other;

characterized in that the beds are mutually movable, between at least a first position, wherein a second bed supported above a first bed at least partially impedes the accessibility of the first bed in a direction perpendicular to the plane in which the first bed extends; and a second position in which at least a larger part of the first bed is free approachable from a direction perpendicular to the plane in which the first bed extends than in the first position, wherein the displacement between the first and the second position requires a displacement of the first bed only, wherein there is at least a free zone of 40 centimeter in said perpendicular direction, and wherein the movement between the first and the second position comprises both a translation, in particular in a width direction, and a rotation of the bed.

15 Claims, 3 Drawing Sheets

(56) References Cited

FOREIGN PATENT DOCUMENTS

| CN | 207040404 U | * | 2/2018 | |
|---|---|---|---|---|
| CN | 109220764 | | 1/2019 | |
| EP | 3387896 A2 | * | 10/2018 | ............ A01G 18/70 |
| EP | 3469889 | | 4/2019 | |
| FR | 1066500 A | * | 6/1954 | ............ A01G 18/62 |
| FR | 1116739 A | * | 5/1956 | ............ A01G 18/62 |
| WO | WO-2017078535 A1 | * | 5/2017 | ............ A01G 18/62 |
| WO | WO-2017105067 A1 | * | 6/2017 | ............ A01G 18/62 |
| WO | WO-2019226046 A1 | * | 11/2019 | ............ A23K 50/75 |
| WO | WO-2020013756 A1 | * | 1/2020 | ............ A01G 18/62 |

OTHER PUBLICATIONS

Requisition by the Examiner dated Oct. 27, 2020 From the Innovation, Science and Economic Development Canada, Canadian Intellectual Property Office Re. Application No. 3,045,087. (8 Pages).

Rapport Betreffende Nieuwheidszonderzoek van Internationaal Type [International Search Report] and Written Opinion dated Jan. 22, 2020 From the International Searching Authority Re. Application No. NL 2023168. (7 Pages).

* cited by examiner

DEVICE FOR GROWING MUSHROOMS

RELATED APPLICATIONS

This application claims the benefit of priority of Netherlands Patent Application Nos. 2023168 filed on May 20, 2019 and 2024382 filed on Dec. 4, 2019, the contents of which are incorporated herein by reference in their entirety.

FIELD AND BACKGROUND OF THE INVENTION

The present invention relates to a device for growing mushrooms.

It is known to grow mushrooms at an industrial scale. At industrial scales, mushrooms are traditionally grown at indoor locations, often called growing rooms, wherein shelvings are placed that support beds for holding compost and casing soil, on which the mushrooms are grown.

In contrast to the pots and containers used in the small scale solutions described above, at industrial scale the compost and casing soil are placed on pulling nets, that allow to fill and empty the bed with compost and casing soil easily. Usually, this is done after every two or three flushes of mushrooms, since the compost has lost its fertility and nutrition then.

The beds are placed at a mutual distance above each other in the shelving, and harvest of the mushrooms takes place manually by harvesters, standing next to the beds at various height levels and delivering the mushrooms to harvesting conveyors once they are cut. From there on they are further processed, either manually or in an automated way.

The beds have an average length of 10 to 100 meters, a width of 0,5 to 2 meters, and are usually placed 0,4 to 1,4 meters above each other. As a result, the harvesters cannot reach all mushrooms without stooping. Given the required speed of working and the total length of the beds, this makes harvesting a cumbersome job, with even certain health risks. Moreover, harvesters tend to stand straight to avoid a painful back, but in this position they only have sight to a part of the bed, with the result that part of the harvesting takes place on intuition, which may have a negative impact on the quality of the work, since a better selection can be made when an eye is kept on the work.

Examples of beds that are suitable for growing mushrooms at an industrial scale are known from various patent publications. Examples are CN203985152, CN 107691121, EP1568265, JP 2012-055234, CN207040403, CN207040404, JP 2012-110285, CN102238477 and NL1027511. Also the 2007 publication by the Wageningen University & Research division Praktijkonderzoek Plant & Omgeving, Paddestoelen, titled "Nieuwe methoden voor de handmatige oogst van champignons" discloses several solutions that are more or less suitable for growing mushrooms at an industrial scale, however, all without providing a solution that takes away the disadvantages of bad sight at the working area and the health consequences thereof.

SUMMARY OF THE INVENTION

It is a goal of the present invention to provide a device for growing mushrooms that takes away the disadvantages of the prior art. The invention thereto proposes a device for growing mushrooms, comprising a shelving, arranged for supporting beds for holding casing soil and compost on a pulling net, said beds for holding casing soil and compost on a pulling net, wherein the beds are placed at a mutual distance above each other, and wherein the beds are mutually movable, between at least a first position, wherein a second bed supported above a first bed at least partially impedes the accessibility of the first bed in a direction perpendicular to the plane in which the first bed extends, and a second position in which at least a larger part of the first bed is free approachable from a direction perpendicular to the plane in which the first bed extends than in the first position, wherein the displacement between the first and the second position requires a displacement of the first bed only, and wherein the movement between the first and the second position comprises a rotation and preferably also a translation, in particular in a width direction, of the bed. Preferably, there is at least a free zone of 40 in said perpendicular direction.

Preferably, there is at least one spring mounted between the bed and a frame of the shelving, wherein the spring is in a more tensioned state when the bed is in the second position than when the bed is in the first position. In other words, the movement of the bed from the first to the second position tensions the spring.

A spring to support the movement from, during and to the first and second position is beneficial for the harvesters in particular, since it requires only very little work to move the beds between positions and as such creating better working conditions. Also for the device itself it is beneficial that this construction is easy to maintain, light in construction and easy to produce. A leaf spring between the bed and the shelving and/or support has the advantage that energy in the spring leaf, results in less force needed for the bed to move from the second position to the first position, since the energy is stored in the spring leaf while the bed moved from the first to the second position. The leaf spring is in a tensed position when the bed is in its second position and in a neutral position when the bed is in its first position, while supporting the bed.

The shelving may in general be constructed as described in, or constructed with any combination of the features disclosed in any of the Dutch patent applications 2021053, 2021456, 2024214, 2024215, 2022318, or 2022703 by the same applicant, which are herein incorporated by reference.

In a preferred embodiment the spring is a leaf spring, which is beneficial due to the characteristics that it is easy to produce, handle and maintain. The leaf spring may be a flat plate, mounted on one side on a frame of the shelving and on the other side on the lower surface of the bed such that the bed is supported by the leaf spring while changing its position. The lower surface of the bed faces the upper surface of the spring leaf.

The construction according to the present invention, wherein the movement between the first and the second position comprises both a translation and a rotation has the advantage that optimal use is made of the available space. The translation and rotation are preferably related such that a side of the bed to which direction the rotation takes place ends up in a lower position than its opposite site. As a result, a bed is moved toward a harvester and rotated such that its surface is optimally available for harvesting.

In a further embodiment, the device according to the present invention may be configured for simultaneously translating and rotating the bed during movement. For that purpose, rotational and horizontal and/or vertical movement directions and positions may be pre-defined for all positions, which allows to further optimize the shelvings. The shelvings may for that purpose comprise a guidance, for translating and rotating the first bed along a predetermined path.

Such guidance may for instance comprise a support with a curved surface, facing the first bed, wherein the movement of the first bed comprises a movement along the curved surface. During this movement the position of a point of support that supports the bed with respect to the guidance is located at various positions with respect to the bed during the movement of the bed from the first to the second position. That means that the bed rests on the support, but during the movement, the exact location with which the bed rests on the support changes.

In a preferred embodiment, the device is configured for displacement of the point of support toward the lowest side of the bed during the movement of the bed from the first to the second position, wherein the leaf spring is mounted such that it prevents the bed from sliding with respect to the shelving and/or support. For safety reasons this is an important advantage. This way, there is no fixed axis of rotation about which the bed rotates, but only an imaginary, momentary axis of rotation can be defined, which may coincide with the point of support. Evidently, since there only a fictive axis of rotation, there is no (need for a) physical shaft.

Moving the imaginary momentary axis of rotation and/or the point of support toward the lowest side results in a more evenly spread or even (essentially) constant force or torque required to move the bed during transition from the first and the second position. This is caused by the fact that the center of gravity of the bed is kept in the vicinity, preferably at a fixed distance from, or essentially above the point of support, which is beneficial both in case of manual and automated movement of the first bed.

For optimizing the leaf spring performance it may be that the leaf spring is pretensioned in the first position of the bed. In addition it may be possible that the pretension is adjustable, suiting the needs of each specific harvester and/or bed for growing mushrooms.

In yet a further embodiment, the device comprises a mechanic coupling between at least two beds, for moving the beds from the first position to the second position simultaneously, in particular the mechanical coupling is coupled to at least two beds that are not adjacent in a vertical direction.

In an embodiment of the device there is at least one pair of beds at the same height supported by the shelving, which beds extend parallel to each other, wherein the pair of beds at or essentially at the same height are rotatable in the opposite direction.

An alternative embodiment for growing mushrooms, comprises a shelving, wherein the shelving comprises at least one portal, the portal comprising at least two essentially vertical stands, connected by at least one beam that extends from a first stand to the second stand. In an embodiment the device comprises multiple beams extending from the first stand to the second stand at various heights along the stands, each beam movably supporting two beds. The beams essentially connect the stands in a horizontal direction, but their shape is not limited to a straight line, may be for example a beam comprising slopes.

The device according to the invention may be provided with an operating device for moving a bed from the first position to the second position, wherein the operating member comprises a lever that is rotatable about an axis of rotation and that is rotatably coupled to an arm at a distance from said axis of rotation, wherein said arm is further rotatably coupled to the bed.

For safety reasons, the beds may be coupled with a belt, chain, cord, string toothed rack or any similar means of fixation to prevent the bed from sliding with respect to the shelving and/or the support. Other solutions as a toothed guidance are also optional.

A lower corner of the bed may further be truncated, for forming a stop in an extreme position of the translation and rotation of the bed. An additional advantage is that this allows a configuration wherein during movement of the bed, no part of the bed extends beyond the contour of the shelving, which increases safety for harvesters and for moving vehicles such as lorries along the shelving.

The above mentioned shelving may form part of a configurations with at least two shelvings, wherein it forms a first shelving and wherein the device comprises a second shelving, placed at the head end of the first shelving, wherein the first and second shelving are configured for displacement of a pulling net with compost and casing soil from the second shelving to the first shelving. Such configuration may comprise a support for the pulling net, wherein the support is placed or placeable between a bed in the first shelving and a bed in the second shelving.

BRIEF DESCRIPTION OF THE SEVERAL VIEWS OF THE DRAWINGS

For this purpose, it is beneficial when the shelving is configured such that there are no parts, in particular stands, impede access to the beds at the ends thereof. The invention will now be elucidated into more detail with reference to the following figures, wherein.

DESCRIPTION OF SPECIFIC EMBODIMENTS OF THE INVENTION

Figure 1:
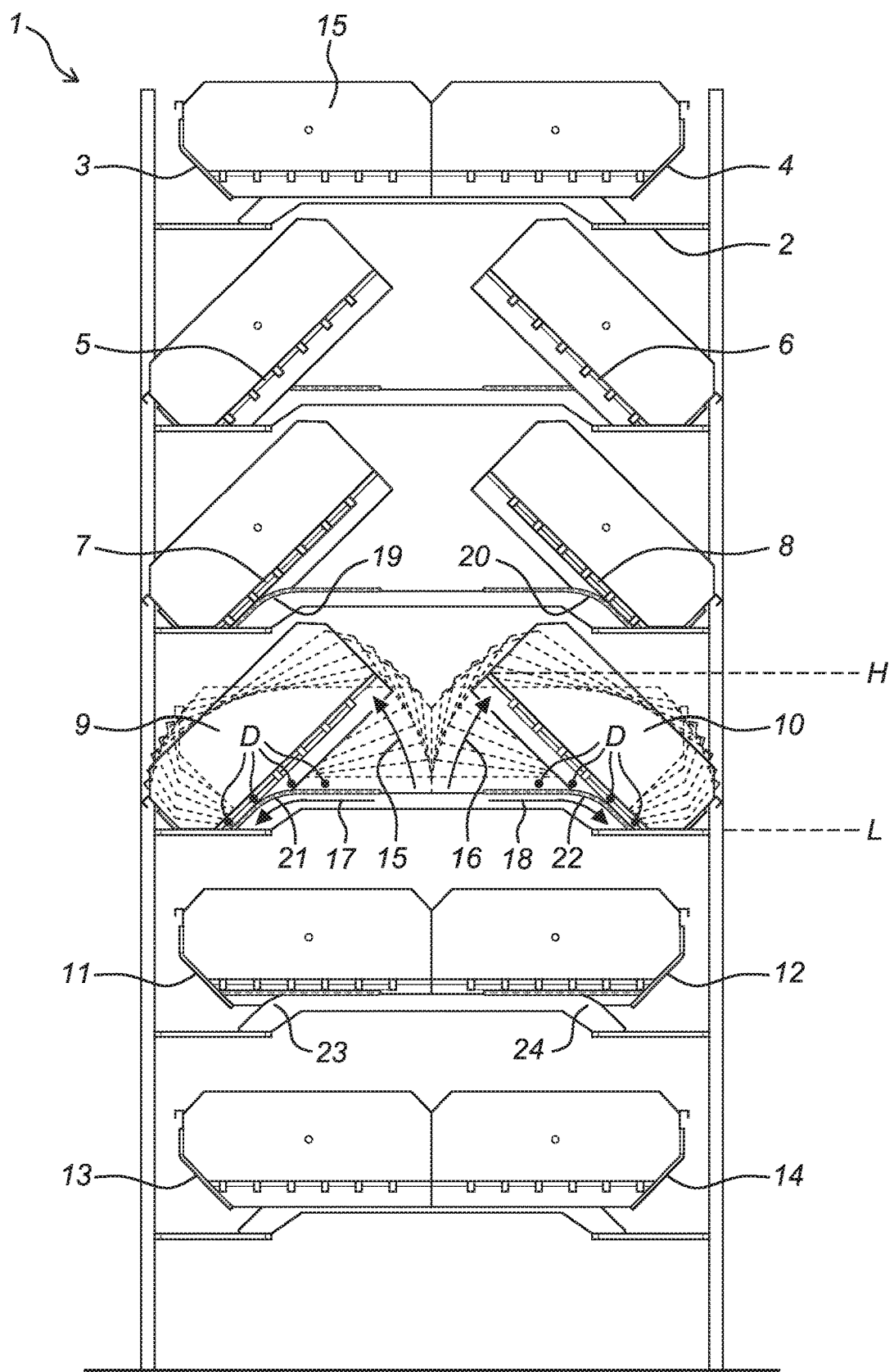
FIG. 1 is a first schematic side-view of a device according to the present invention.

FIG. 1 shows a device 1 for growing mushrooms, comprising a shelving 2, arranged for supporting beds 3-14 for holding casing soil and compost 15 on a pulling net, wherein the beds 3-14 are placed at a mutual distance above each other and the beds are mutually movable, between at least a first position (shown for beds 3, 4 and 11-14), wherein a second bed supported above a first bed at least partially impedes the accessibility of the first bed in a direction perpendicular to the plane in which the first bed extends; and a second position (shown for beds 5-8) in which at least a larger part of the first bed is free approachable from a direction perpendicular to the plane in which the first bed extends than in the first position, bed, wherein there is at least a free zone of 40 in said perpendicular direction, wherein the displacement between the first and the second position requires a displacement of the first bed only. The movement between the first and the second position comprises both a translation, in particular in a width direction, and a rotation of the bed. Various positions during movement from the first to the second position are shown for beds 9 and 10. n the figure, it is visible that the translation and rotation are related such that a side of the bed to which direction the rotation takes place ends up in a lower position L than the higher position H of its opposite site. The device is configured for simultaneously translating and rotating during movement, along a predetermined path. The guidance comprises a support 19-24, indicated in the figure for beds 7-12 respectively. The supports 19-24 comprise a curved surface, facing the first bed, and wherein the movement of the first bed comprises a movement along 17, 18 the curved surface 21, 22.

The position of a point of support that supports the bed with respect to the guidance is located at various positions, indicated with dots D with respect to the bed 9, 10 during the movement of the bed 9, 10 from the first to the second position.

Figure 2:
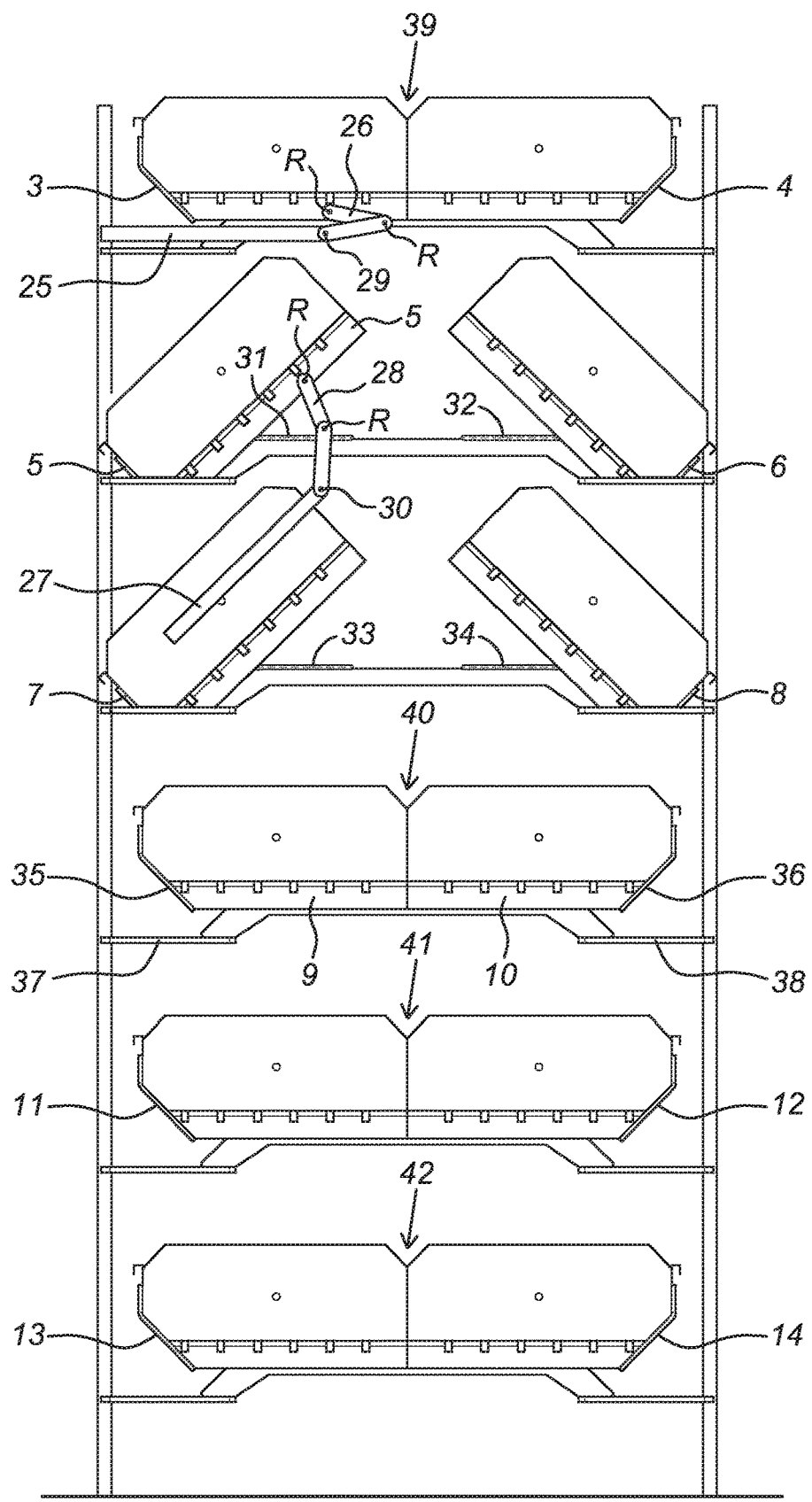
FIG. 2 is a second schematic side-view of a device according to the present invention.

FIG. 2 shows the device from FIG. 1, wherein for beds 3 and 5 as an example, an operating device 25, 26 for moving a bed from the first position to the second position is depicted, wherein the operating member comprises a lever 25, 27 that is rotatable about an axis of rotation 29, 30 and that is rotatably coupled to an arm 26, 28 at a distance from said axis of rotation, wherein said arm is further rotatably coupled to the bed 3, 5.

The beds are coupled with a belt or chain 31-34 to the shelving. At least a lower corner 35, 36 of the beds is truncated, for forming a stop in an extreme position of the translation and rotation of the bed. Cooperating abutments 37, 38 may be provided for that purpose.

Visible in the figure is also that when beds at a same level in the shelving are both in the first position, they touch 39, 30, 41, 42 each other, leaving no free space in between. This has the advantage that no air passage in a vertical direction is possible between the beds when they are in their horizontal position.

Figure 3:
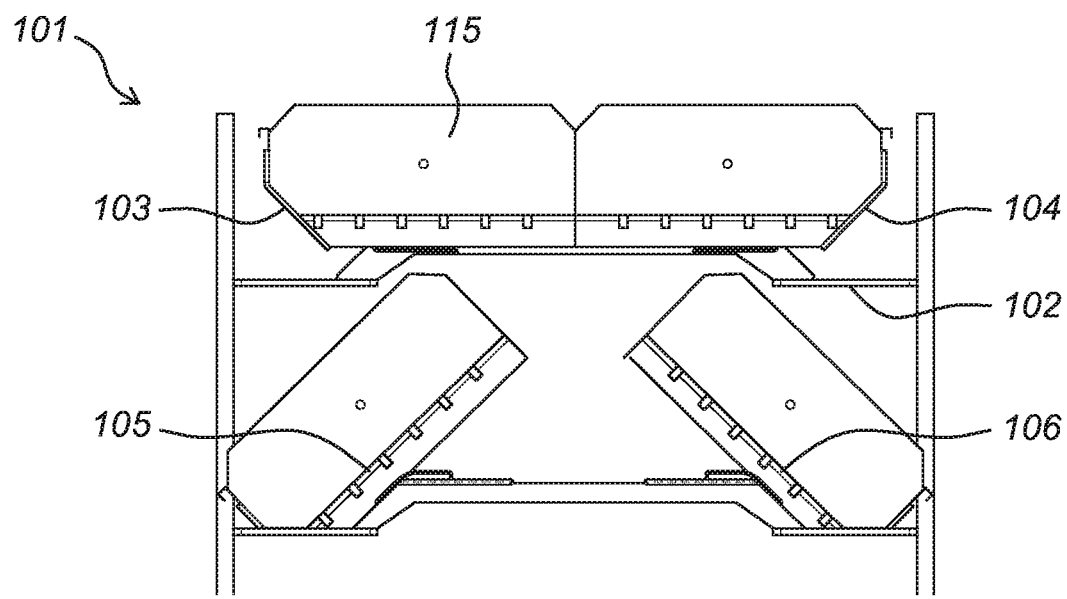
FIG. 3 is a first schematic side-view of part a device according to an alternative embodiment of the present invention.

FIG. 3 shows a device 101 for growing mushrooms, comprising a shelving 102, arranged for supporting beds 103-106 for holding casing soil and compost 115 on a pulling net, wherein the beds 103-106 are placed at a mutual distance above each other and the beds are mutually movable, between at least a first position (shown for beds 103, 104), wherein a second bed supported above a first bed at least partially impedes the accessibility of the first bed in a direction perpendicular to the plane in which the first bed extends; and a second position (shown for beds 105, 106) in which at least a larger part of the first bed is free approachable from a direction perpendicular to the plane in which the first bed extends than in the first position, bed, wherein there is at least a free zone of 40 cm in said perpendicular direction, wherein the displacement between the first and the second position requires a displacement of the first bed only. The movement between the first and the second position comprises both a translation, in particular in a width direction, and a rotation of the bed. The device is configured for simultaneously translating and rotating during movement, along a predetermined path.

Figure 4:
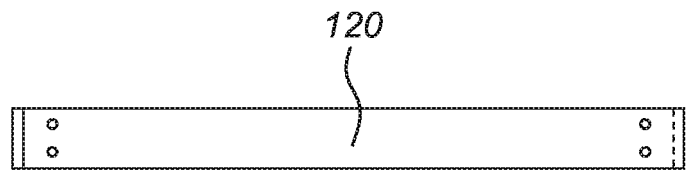
FIG. 4 is a top view of a spring leaf according to the present invention.

FIG. 4 shows a top view of a leaf spring 120, as may be used in the device according to the present invention, to be mounted between the bed and the support or frame of the shelving.

Figure 5:
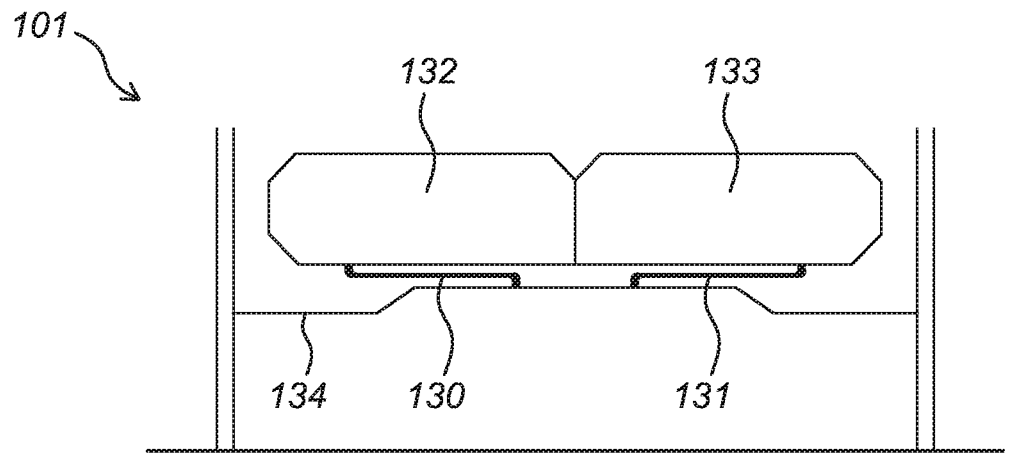
FIG. 5 is a second schematic side-view of part of a device according to the alternative embodiment from FIG. 3 of the present invention.

FIG. 5 shows a schematic side view of a leaf spring 130, 131, wherein the leaf spring 130, 131 is mounted between the bed 132, 133 and a frame of the shelving 34, such that the movement of the bed 132, 133 from the first to the second position tensions the spring 130, 131.

The figures are for illustrative purposes only and do in no sense limit the scope of protection as defined by the following claims.

What is claimed is:

1. Device (1) for growing mushrooms, comprising:
   a shelving (2),
   arranged for supporting beds (3-14) for holding casing soil and compost (15) on a pulling net, each bed supported at a point of support by a guidance, for translating and rotating the first bed along a predetermined path;
   said beds for holding casing soil and compost on a pulling net,
   wherein the beds are
   placed at a mutual distance above each other; and
   mutually movable, between at least:
     a first position, wherein a second bed supported above a first bed (3, 4, 11-14) at least partially impedes the accessibility of the first bed (3, 4, 11-14) in a direction perpendicular to the plane in which the first bed (3, 4, 11-14) extends; and
     a second position in which at least a larger part of the first bed (5-8) is free approachable from a direction perpendicular to the plane in which the first bed (5-8) extends than in the first position,
   wherein:
     the displacement between the first and the second position requires a displacement of the first bed only,
   wherein:
     the movement between the first and the second position comprises both a translation, in particular in a width direction, and a rotation of the bed (3-14),
   wherein:
     the beds are coupled with means of fixation to prevent the bed from sliding with respect to the shelving and/or the support; and
   wherein:
     the device is configured for at least one of:
       a displacement of the point of support of the bed toward the lowest side of the bed during the movement of the bed from the first to the second position, and
       keeping a center of gravity of the bed at a fixed distance above the point of support of the bed.

2. Device according to claim 1, wherein at least one spring is mounted between the bed and a frame of the shelving, wherein the spring is in a more tensioned state when the bed is in the second position than when the bed is in the first position.

3. Device according to claim 2, wherein the at least one spring is a leaf spring.

4. Device according to claim 3, comprising the guidance, for translating and rotating the first bed along a predetermined path, in particular wherein the guidance comprises a support, comprising a curved surface, facing the first bed, and wherein the movement of the first bed comprises a movement along the curved surface.

5. Device according to claim 4, wherein the leaf spring is pretensioned in the first position of the bed, in particular wherein the pretension is adjustable.

6. Device according to claim 3, wherein the leaf spring, placed between the guidance and the bed, as such provides guidance for the bed to move between the first and the second position and is mounted on the bed with one end and mounted on a frame of the shelving with the other end, such that the leaf spring supports the bed, with the upper surface of the leaf spring facing the lower surface of the bed.

7. Device according to claim 1, wherein the translation and rotation are related such that a side of the bed to which direction the rotation takes place ends up in a lower position than in an opposite side of the bed to which direction the rotation takes place.

8. Device according to claim 1, configured for simultaneously translating and rotating during movement.

9. Device according to claim 1, wherein the device comprises a mechanic coupling between at least two beds, for moving the beds from the first position to the second position simultaneously, in particular the mechanical coupling is coupled to at least two beds that are not adjacent in a vertical direction.

10. Device according to claim 1, wherein there is at least one pair of beds at the same height supported by the shelving, which beds extend parallel to each other, wherein the pair of beds at or essentially at the same height are rotatable in the opposite direction.

11. Device according to claim 1, wherein the shelving comprises at least one portal, the portal comprising at least two essentially vertical stands, connected by at least one beam that extends from a first stand to the second stand, wherein at least two beds are movably supported by the at least one beam.

12. Device according to claim 1, provided with a height-adjustable conveyor belt, which extends in the longitudinal direction of the beds, and is movable in height to positions which correspond to a lower end of a bed situated in a second position.

13. Device according to claim 12, comprising a support for the pulling net, wherein the support is placed or placeable between a bed in a first shelving and a bed in a second shelving.

14. Method for growing mushrooms, comprising the use of a device according to claim 1.

15. Method according to claim 14, comprising moving the first bed to the second position and approaching the first bed from a direction perpendicular to the first beds surface for harvesting mushrooms.

* * * * *